United States Patent [19]

Kanai

[11] Patent Number: 5,478,458
[45] Date of Patent: Dec. 26, 1995

[54] WATER PURIFIER

[76] Inventor: Masakuni Kanai, 108, Hayama Ekohaitsu, 1750, Isshiki, Hayama-machi, Miura-gun, Kanagawa, 240-01, Japan

[21] Appl. No.: 269,561

[22] Filed: Jul. 1, 1994

[51] Int. Cl.⁶ ............................................. C25B 1/00
[52] U.S. Cl. .................... 204/248; 204/249; 204/259
[58] Field of Search ........................... 204/149, 259, 204/271, 248, 249

[56] References Cited

U.S. PATENT DOCUMENTS

| | | | |
|---|---|---|---|
| 2,042,534 | 6/1936 | Krause | 204/271 |
| 3,222,269 | 12/1965 | Stanton | 204/270 |
| 3,414,497 | 12/1968 | Kanai | 204/149 |
| 4,287,031 | 9/1981 | Good | 204/109 |
| 4,447,136 | 6/1982 | Dahlgren | 359/641 |
| 4,770,755 | 9/1988 | Valanti et al. | 204/225 |
| 5,085,753 | 2/1992 | Sherman | 204/267 |
| 5,256,263 | 10/1993 | Kanai | 204/149 |

*Primary Examiner*—John Niebling
*Assistant Examiner*—Brendan Mee
*Attorney, Agent, or Firm*—Price, Gess & Ubell

[57] ABSTRACT

A water purifier capable of accomplishing water purification in a water area in which water purification is desired by merely dipping it in water without any additional operation. The water purifier includes a hollow cylindrical cell chamber member, a seal member arranged at each of both ends of the cell chamber member so as to pressedly seal the end, a terminal inserted through the seal member and electrically connected at one side thereof to each of the cells received in the cell chamber member, an annular tightening member threadedly fitted on each end of the cell chamber member to press the seal member into each end of the cell chamber member, an electrode plate connected to the other side of the terminal, and a water-permeable agent basket having a calcium fluoride agent and an iron salt agent received therein and releasably mounted on the tightening member through locking members so as to surround the electrode plate.

17 Claims, 1 Drawing Sheet

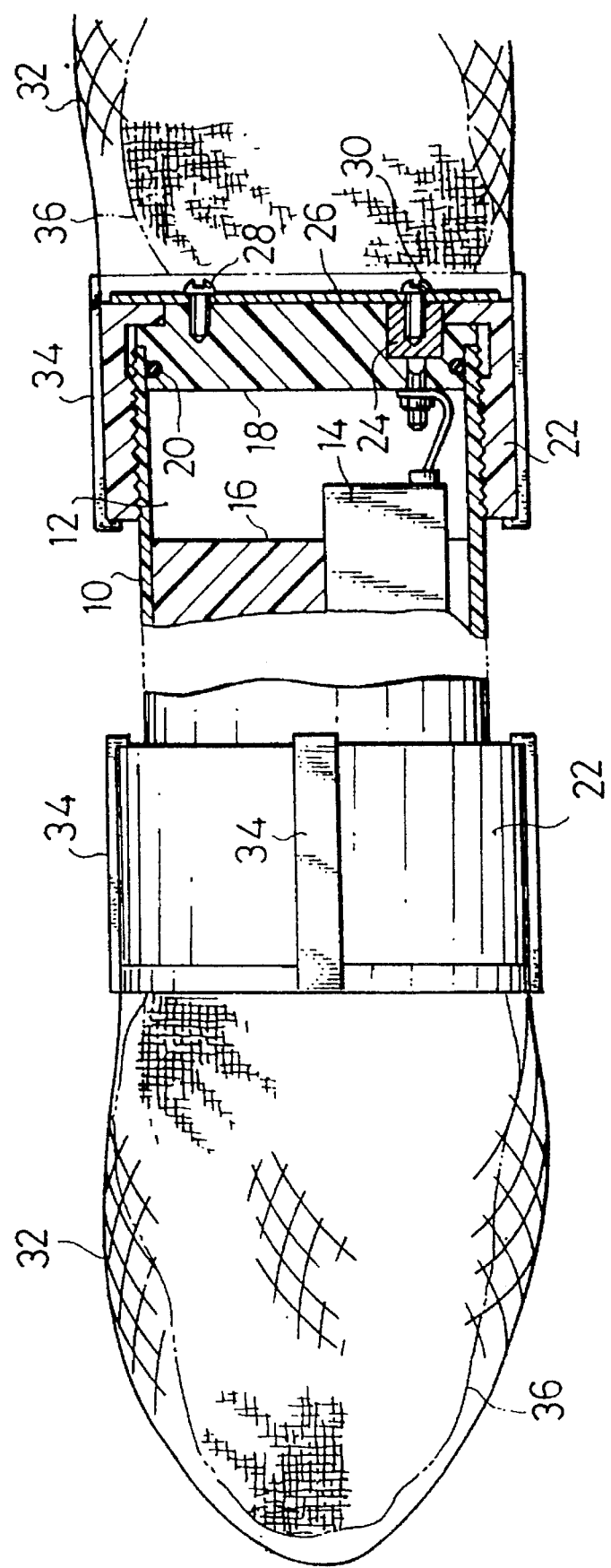

WATER PURIFIER

BACKGROUND OF THE INVENTION

1. Field of the Invention

This invention relates to a water purifier and, more particularly, to a simplified water purifier for purifying polluted fresh water or sea water by a process of fluorine ion electrolysis.

2. Description of Related Art

Recently, pollution of water areas such as ponds, lakes and marshes, rivers, adjoining seas, and the like by pollutants such as dissolved organic matters, bacteria and the like has progressed greatly to cause extensive damage to aquatic lives and the like.

Purification of a polluted water area has been conventionally carried out by an aeration plant installed therein or a water treatment plant installed on the land near the area so that polluted water can be pumped for treatment to purify it.

Unfortunately, the prior art described above causes an increase in cost of equipment and operating costs, as well as complexity in management for operation and maintenance.

OBJECTS AND SUMMARY OF THE INVENTION

The present invention has been made in view of the foregoing disadvantage of the prior art.

Accordingly, it is an object of the present invention to provide a water purifier which is capable of effectively accomplishing purification of polluted water while simplifying a construction thereof.

It is another object of the present invention to provide a water purifier which is capable of simplifying an operation thereof because of requiring only an operation of immersing or dipping it in polluted water substantially without any additional operation.

It is a further object of the present invention to provide a water purifier which is capable of permitting fluorine ion electrolysis to be smoothly carried out for water purification.

In accordance with the present invention, a water purifier is provided. The water purifier includes a cell chamber member which is formed into a hollow cylindrical shape so as to have a cylindrical cell chamber defined therein, at least one cell arranged in the cell chamber, electrode plates each provided at both sides of the cell chamber member and electrically connected to the cell, and water-permeable agent receivers each having a calcium fluoride agent and an iron salt agent received therein so as to surround each of the electrode plates.

At least one such water purifier, constructed as described, is arranged in a water area in which water purification is desired. For example, the water purifiers may be arranged in a fish preserve in the sea while being placed on a bottom thereof or suspended at a suitable depth therein. This permits fluorine ions (F$^-$) produced by the calcium fluoride (CaF$_2$) agent and the iron salt agent to exhibit an agglomerating action, leading to deposition or precipitation of organic matters dissolved in water and sterilization of bacteria, viruses and the like, resulting in an improved water environment for growth of aquatic lives. As a result of an experiment wherein the water purifier of the present invention was applied to ocean culture of wakame seaweed, it was found that it exhibits a remarkable effect on growth of wakame seaweed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein:

The single FIGURE is a partially vertical sectional side elevational view showing an embodiment of a water purifier according to the present invention.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved water purifier.

A water purifier according to the present invention will now be described with reference to the single figure, which shows an embodiment of a water purifier according to the present invention.

A water purifier of the illustrated embodiment, as shown in the single figure, includes a battery or cell chamber member 10 of a hollow cylindrical shape in which a battery or cell chamber 12 is defined for storing at least one battery or cell 14 therein. Other sources of voltage can be used in alternative embodiments of the invention. The words "cell" and "battery" used herein have substantially the same meaning. In the single figure, the cell 14 is partially shown for the sake of brevity. The cells 14 are each held in place in the cell chamber 12 by means of each of the holding members 16 arranged in the cell chamber 12. The cell chamber member 10 is provided at each of both ends thereof with a seal member 18, which is externally pressedly fitted in the end of the cell chamber member 10 for water-tightly sealing or closing the end of the cell chamber member 10, to thereby provide the cell chamber 12 with liquid-tightness. For this purpose, the seal members 18 are each provided with an O-ring 20 and fitted into each end of the cell chamber member 10 by an annular pressing or tightening member 22 threadedly fitted on each end of the cell chamber member 10. The tightening members 22 each have a terminal 24 inserted therethrough, of which an inner side or end is electrically connected to the cell 14. The tightening member 22 is provided on an outer end thereof with an electrode plate 26, which is fixed on the seal member 18 by means of screws 28. The electrode plate 26 is electrically connected to the terminal 24 by means of a single screw 30. One of the electrode plates 26 works as an anode, and the other works as a cathode. Alternatively, both of the electrodes may be used as anodes, and the cell chamber member 10 may be used as a cathode.

The water purifier of the illustrated embodiment also includes water-permeable baskets 32 in each of which agents for water purification are received. The agent receiving baskets 32 are each arranged so as to surround each of the electrode plates 26 and are mounted on an outer periphery of a proximal end thereof with a locking structure 34 which is constructed so as to be releasably engaged with an outer periphery of the tightening member 22, resulting in being releasably fitted on the tightening member 22 and, therefore, the cell chamber member 10 through the locking structure 34. In the illustrated embodiment, the locking structures 34 each comprise a plurality of elastic locking members which may be formed into a pawl-like shape.

In the water-permeable basket 32 are received a calcium fluoride ($CaF_2$) agent and an iron salt agent while being preferably stored in a water-permeable net bag 36. The $CaF_2$ agent may be made of fluorite into a suitable shape such as a powder-like shape, a particle-like shape, a block-like shape or the like. The iron salt agent may be made of a ferrous salt such as ferrous chloride, ferrous sulfate or the like, or a ferric salt such as ferric chloride or ferric sulfate or the like. Both agents are received in the basket 32 at a ratio of 300 parts of the $CaF_2$ agent to 1 part of the iron salt agent.

$CaF_2$ generally has a decomposition voltage of about 3 V. Thus, purification of fresh water is accomplished using a 3 V cell for each of the cells 14, whereas that of sea water is attained using a 1.5 V cell. Also, in the case of sea water, each of the electrode plates 26 can be formed with a decreased area. In order to prevent short-circuiting, it is preferable to form the cell chamber 12 in the cell chamber member 10 with an increased length.

The manner of operation of the water purifier of the illustrated embodiment will now be described. At least one water purifier constructed as described is arranged in a water area in which water purification is desired. For example, the water purifier may be arranged in a fish preserve in the sea while being placed on a bottom thereof or suspended at a suitable depth therein. This permits a voltage to be induced between the electrode plates 26 connected to the cells 14 in the cell chamber 12 through water introduced into the agent receiving basket 32, so that HF may be produced by electrolysis of the $CaF_2$ agent received in the basket 32, to thereby provide fluorine ions ($F^-$). The fluorine ions thus produced are each replaced with terminal groups of organic matters in water to be removed, to thereby form polar molecules, which then agglomerate together to form particles of a size as large as colloidal particles. Concurrently, iron ions produced from the iron salt agent exhibit an agglomerating action to subject the particles to flocculation, so that the particles may be deposited or precipitated, resulting in being removed from the water. Simultaneously, the fluorine ions cause viruses, bacteria and the like in the water to become extinct.

The number of water purifiers to be placed in water depends on an area of a water area to be purified, a depth thereof and the like.

Replacement of the cells 14 and agents consumed may be readily carried out by disassembling the water purifier. Thus, the water purifier may exhibit service-ability over an increased period of time. More particularly, when the agents received in each of the baskets 32 are consumed, replenishment of the agents to the basket 32 may be readily accomplished by detaching the basket 32 from the tightening member 22. Replacement of each of the cells 14 consumed may be carried out by removing the tightening member 22 from the cell chamber member 10.

Also, the water purifier of the illustrated embodiment is, of course, effectively applicable to purification of water in a pool, a bathtub or the like.

As can be seen from the foregoing, the water purifier of the present invention is constructed in a highly simplified manner. More particularly, it permits mere dipping of it in water to concurrently lead to fluorine electrolysis and dissolution of the iron salt, so that removal of any organic matter dissolved in water and extinction of bacteria may be effectively carried out to lead in purification of water to a degree sufficient to improve a water environment for growth of aquatic lives. Also, the water purifier is effectively applied to purification of water in a pool or the like.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A water purifier comprising:

a cell chamber member which is formed into a hollow cylindrical shape so as to have a cylindrical cell chamber defined therein;

at least one battery arranged in said cell chamber;

electrode plates each provided at opposite sides of said cell chamber member and electrically connected to said cell, the length of the cell chamber member is sufficient to prevent a short-circuit of the battery; and a pair of water-permeable agent receivers, each having a calcium fluoride agent and an iron salt agent received therein, one of the receivers surrounds each of said electrode plates.

2. A water purifier as defined in claim 1, further comprising:

seal members each arranged at each of both ends of said cell chamber member so as to seal each end of said cell chamber member;

terminals each inserted through each of said seal members and electrically connected at one side thereof to said cell; and annular tightening members each threadedly fitted on each end of said cell chamber member to sealedly fit the seal member in each end of said cell chamber member;

said electrode plates each being connected to the other side of each of said terminals; and said water-permeable agent receivers being releasably mounted on each of said tightening member.

3. A water purifier as defined in claim 2, wherein said electrode plates are each fixed on each of said seal members.

4. A water purifier as defined in claim 2, further comprising locking structures each releasably mounted on each of said tightening members, said water-permeable agent receivers each being mounted on each of said tightening members through each of said locking structures.

5. A water purifier as defined in claim 1, wherein said water-permeable agent receivers each comprise a basket.

6. A water purifier as defined in claim 2, wherein said water-permeable agent receivers each comprise a basket.

7. A water purifier as defined in claim 4, wherein said water-permeable agent receivers each comprise a basket.

8. A water purifier as defined in claim 5, wherein said agents are received in a net bag while said net bag is stored in said water-permeable basket.

9. A water purifier as defined in claim 6, wherein said agents are received in a net bag while said net bag is stored in said water-permeable basket.

10. A water purifier as defined in claim 7, wherein said agents are received in a net bag while said net bag is stored in said water-permeable basket.

11. A water purifier as defined in claim 1, wherein said cell is received in said cell chambers in a replaceable manner.

12. A water purifier as defined in claim 2, wherein said cell is received in said cell chambers in a replaceable manner.

13. A self-contained water purifier device comprising:

a hollow housing member immersible in water;

a battery contained within the hollow housing member;

sealing means for sealing the hollow housing member to prevent water from contacting the battery;

a first and second electrode mounted on separate opposite sides of the housing member and connected to the battery, one of the electrodes being mounted on the sealing means;

a first and second water permeable member mounted to respectively extend over the first and second electrodes; and a mixture of agents for producing a fluorine ions and iron ions are positioned in each of the respective first and second water permeable members whereby fluorine ions and iron ions are produced in each permeable member and the iron ions provide an agglomerating action to provide a flocculation of organic matter.

14. A water purifier device as defined in claim 13, wherein the first and second water permeable members include elastic pawls of a dimension to removably be mounted on the hollow housing member.

15. A water purifier device as defined in claim 13, wherein the ratio of agents is 300 parts of a fluorine ion producing material to 1 part of an iron ion producing material.

16. A water purifier device as defined in claim 15, wherein one agent is calcium fluoride and the other agent is an iron salt composition.

17. A water purifier as defined in claim 2 wherein 300 parts of the calcium fluoride agent are mixed with 1 part of the iron salt agent.

* * * * *